(12) United States Patent
Sato

(10) Patent No.: US 10,993,789 B2
(45) Date of Patent: May 4, 2021

(54) ORTHODONTIC IMPLANT DEVICE

(71) Applicant: MEDICAL CORPORATION CREATING SMILES, Sendai (JP)

(72) Inventor: Renya Sato, Sendai (JP)

(73) Assignee: MEDICAL CORPORATION CREATING SMILES, Sendai (JP)

( * ) Notice: Subject to any disclaimer, the term of this patent is extended or adjusted under 35 U.S.C. 154(b) by 84 days.

(21) Appl. No.: 16/211,423

(22) Filed: Dec. 6, 2018

(65) Prior Publication Data

US 2019/0105132 A1 Apr. 11, 2019

Related U.S. Application Data

(63) Continuation of application No. PCT/JP2017/032006, filed on Sep. 5, 2017.

(30) Foreign Application Priority Data

Sep. 10, 2016 (JP) .............................. JP2016-177178

(51) Int. Cl.
*A61C 8/00* (2006.01)
*A61C 7/12* (2006.01)
(Continued)

(52) U.S. Cl.
CPC .............. *A61C 8/0096* (2013.01); *A61C 7/00* (2013.01); *A61C 7/12* (2013.01); *A61C 7/20* (2013.01)

(58) Field of Classification Search
CPC ........... A61C 8/0096; A61C 7/00; A61C 7/10; A61C 7/12; A61C 7/20
(Continued)

(56) References Cited

U.S. PATENT DOCUMENTS 4,639,219 A * 1/1987 Gagin ...................... A61C 7/12
433/22
5,967,772 A * 10/1999 Gray ........................ A61C 7/00
433/18
(Continued)

FOREIGN PATENT DOCUMENTS

JP 11-278002 A 10/1999
JP 2002-169126 A 6/2002
(Continued)

OTHER PUBLICATIONS

International Search Report dated Oct. 10, 2017, issued in counterpart application No. PCT/JP2017/032006 (2 pages).
(Continued)

*Primary Examiner* — Matthew M Nelson
(74) *Attorney, Agent, or Firm* — Westerman, Hattori, Daniels & Adrian, LLP

(57) ABSTRACT

A problem is to provide an orthodontic implant device that can be easily prepared, and can extend a range of selection of materials forming an extension arm.
A solution is the orthodontic implant device having: a pair of anchor members 10 which are fixed to a palate M1; a bridge member 20 arranged so as to link places between the pair of anchor members 10; an arrangement member 30 arranged in the bridge member 20; and an extension arm 40 to move teeth M2. The arrangement member 30 has a fixing portion 31 for fixing the extension arm 40, and a wire-shaped projection portion for arranging the fixing portion 31 in the bridge member 20.

6 Claims, 6 Drawing Sheets

(51) Int. Cl.
*A61C 7/00* (2006.01)
*A61C 7/20* (2006.01)

(58) Field of Classification Search
USPC .......................................................... 433/18
See application file for complete search history.

(56) References Cited

U.S. PATENT DOCUMENTS

| | | | |
|---|---|---|---|
| 6,435,870 B1 | 8/2002 | Walde | |
| 7,677,887 B2* | 3/2010 | Nicholson | A61C 7/28 433/11 |
| 2003/0073052 A1* | 4/2003 | Yamamoto | A61C 7/20 433/20 |
| 2009/0004619 A1 | 1/2009 | Oda et al. | |
| 2009/0098499 A1* | 4/2009 | Mitani | A61C 7/06 433/5 |
| 2010/0003634 A1 | 1/2010 | Cousley | |
| 2010/0112506 A1* | 5/2010 | Itsuki | A61C 7/00 433/2 |
| 2010/0151401 A1* | 6/2010 | Scheffler | A61C 7/00 433/2 |
| 2010/0190128 A1* | 7/2010 | Wool | A61C 7/20 433/20 |
| 2010/0261130 A1* | 10/2010 | Williams | A61C 7/10 433/7 |
| 2011/0165532 A1* | 7/2011 | Benvegnu' | A61C 7/287 433/18 |
| 2011/0300503 A1* | 12/2011 | Benvegnu | A61C 7/00 433/22 |
| 2012/0003600 A1* | 1/2012 | Winsauer | A61C 7/00 433/7 |
| 2012/0202164 A1 | 8/2012 | Hsu et al. | |
| 2013/0230820 A1* | 9/2013 | Carrillo Gonzalez | A61C 7/145 433/7 |
| 2014/0170586 A1* | 6/2014 | Cantarella | A61C 7/20 433/22 |
| 2015/0313659 A1* | 11/2015 | Miyawaki | F16B 39/282 606/303 |
| 2016/0120622 A1* | 5/2016 | Montalban | A61C 7/10 433/7 |
| 2018/0338564 A1* | 11/2018 | Oda | A61C 7/002 |

FOREIGN PATENT DOCUMENTS

| | | | |
|---|---|---|---|
| JP | 2003-311355 A | 11/2003 | |
| JP | 2015-83153 A | 4/2015 | |
| JP | 5728610 B1 * | 6/2015 | A61C 7/12 |
| JP | 2016-36474 A | 3/2016 | |

OTHER PUBLICATIONS

Extended European Search Report, dated Jul. 1, 2020, that issued in counterpart European Patent Application No. 17848775.7 (in English; 8 pages).

* cited by examiner

US 10,993,789 B2

ORTHODONTIC IMPLANT DEVICE

TECHNICAL FIELD

The invention relates to an orthodontic implant device which is fixed in an oral cavity to move teeth.

BACKGROUND ART

Securement of an anchorage is an important factor for leading treatment to success in orthodontic treatment, and various devices for intramaxillary fixation, extraoral fixation and the like have been used so far for reinforcing the anchorage. However, these devices have had a disadvantage in which the effect depends on a degree of patient cooperation. Then, in recent years, a method of moving teeth by applying a bone as the anchorage (implant anchor) has been devised, and has rapidly spread as a device to be incorporated into part of a multi-bracket system. As the implant anchor, a screw type anchor is inexpensive and simple, and has significantly small surgical stress during implanting, and therefore has been widely used. However, the screw type implant anchor has a limitation on an implanting position, and a problem of fall-off has remained in several cases. In particular, on maxillary buccal side, the implanting position is limited in many cases for the reasons of proximity of tooth roots of adjacent teeth, projection of a maxillary sinus between the tooth roots, narrowness of attached gingival width, and the like. Moreover, even if the implant anchor can be implanted into the alveolar bone between narrow tooth roots, existence thereof limits movement of the teeth in several cases. Further, many problems remain in the implant anchor, such as an increase in a fall-off rate if bone density is low, damage on the tooth root during implanting, and fall-off of the implant anchor caused in association therewith, and burial of the implant anchor head into the gingiva caused by implanting into the free gingival region.

Therefore, proposals have recently been made on an orthodontic implant device in which the screw type implant anchor is implanted into a palate having good bone quality and no limitation on movement of the teeth. For example, the applicant of the present application has developed an orthodontic implant device comprising a pair of anchor members which are fixed in a palate; a bridge member formed in extending so as to link places between the pair of anchor members and fixed to the pair of anchor members; and a connecting member arranged in the bridge member, and provided with a prismatic receiving portion into which a rectangular wire can be inserted, in which part of an extension arm is inserted into the prismatic receiving portion, and is connected thereto (see Patent Literature 1). According to the orthodontic implant device, the extension arm can be stably fixed in the oral cavity without causing rotation by inserting an insertion portion formed of the rectangular wire for the extension arm into the prismatic receiving portion.

CITATION LIST

Patent Literature

Patent Literature 1: JP 2016-36474 A

SUMMARY OF INVENTION

Technical Problem

However, an insertion portion formed of a rectangular wire has been so far bonded by brazing or the like to an arm portion formed of a wire which is fixed to teeth to move the teeth, for example. Therefore, even if an attempt is made on forming the arm portion by a superelastic alloy such as a nickel-titanium alloy, a problem of loss of elasticity by heating during brazing has remained. Moreover, the insertion portion to be bonded to the arm portion is significantly small, and therefore particularly in a case where a dentist prepares the arm portion according to a treatment content, or the like, problems of cumbersome operation of brazing and needing time and effort also have remained.

The invention has been made based on such problems, and contemplated for providing an orthodontic implant device that can be easily prepared and extend a range of selection of materials forming an extension arm.

Solution to Problem

An orthodontic implant device according to the invention is a device which is fixed in an oral cavity to perform orthodontics by connecting an extension arm formed of a wire for moving teeth, and the device comprising: a pair of anchor members which are fixed in the oral cavity, each having a shank on which a ridge is formed, and a head formed in one end of the shank, in which a head groove having a perpendicular relationship between side surfaces and a bottom surface is formed in the head; a bridge member arranged so as to link places between the pair of anchor members; and an arrangement member having a fixing portion for fixing the extension arm, and a wire-shaped projection portion for arranging the fixing portion in the bridge member, in which the bridge member has a connecting portion provided with an insertion hole into which the projection portion is to be inserted, and a pair of rectangular wire-shaped portions arranged in the connecting portion, and to be fitted into the head grooves of the pair of anchor members, and the fixing portion has a fixing groove having a perpendicular relationship between side surfaces and a bottom surface, and part of the extension arm is fitted into and caulked at the fixing portion, thereby being fixed at the fixing portion.

Another orthodontic implant device according to the invention comprises: an extension arm formed of a wire, which is fixed to teeth to move the teeth; a pair of anchor members which are fixed in an oral cavity, each having a shank on which a ridge is formed, and a head formed in one end of the shank, in which a head groove having a perpendicular relationship between side surfaces and a bottom surface is formed in the head; a bridge member arranged so as to link places between the pair of anchor members; and an arrangement member having a fixing portion for fixing the extension arm, and a wire-shaped projection portion for arranging the fixing portion in the bridge member, in which the bridge member has a connecting portion provided with an insertion hole into which the projection portion is to be inserted, and a pair of rectangular wire-shaped portions arranged in the connecting portion, and to be fitted into the head grooves of the pair of anchor members, and the fixing portion has a fixing groove having a perpendicular relationship between side surfaces and a bottom surface, and part of the extension arm is fitted into and caulked at the fixing portion, thereby being fixed at the fixing portion.

Advantageous Effects of Invention

According to an orthodontic implant device of the invention, the device is configured in such a manner that the device has an arrangement member having a fixing portion for fixing an extension arm, and a wire-shaped projection portion for arranging the fixing portion in a bridge member, and a fixing groove having a perpendicular relationship between side surfaces and a bottom surface is formed in the fixing portion, and part of the extension arm is fitted into and caulked at the fixing portion, thereby being fixed at the fixing portion. Therefore, the extension arm can also be formed of a superelastic alloy weak to heat, or the like, and a range of selection of materials can be extended. Moreover, the extension arm can be easily fixed even if a size of a member is small, and time and effort can be reduced.

Moreover, if the device is configured in such a manner that a plurality of projection portions are provided for the arrangement member, and a plurality of insertion holes are provided for a connecting portion of the bridge member, wobbling caused by rotation of the arrangement member can be suppressed, and the extension arm can be stably arranged.

Further, if the device is configured in such a manner that the plurality of fixing portions are provided for the arrangement member, the projection portion of the arrangement member is inserted into the insertion hole of the bridge member, and a ligature wire is passed through places between the fixing portions for each, and the arrangement member and the bridge member can be easily fixed by the ligature wire, for example. Accordingly, a catching portion for catching the ligature wire is not required to be provided in particular, and a configuration can be simplified.

DESCRIPTION OF EMBODIMENTS

In the following, embodiments of the invention are described in detail with reference to drawings.

One Embodiment

Figure 1:
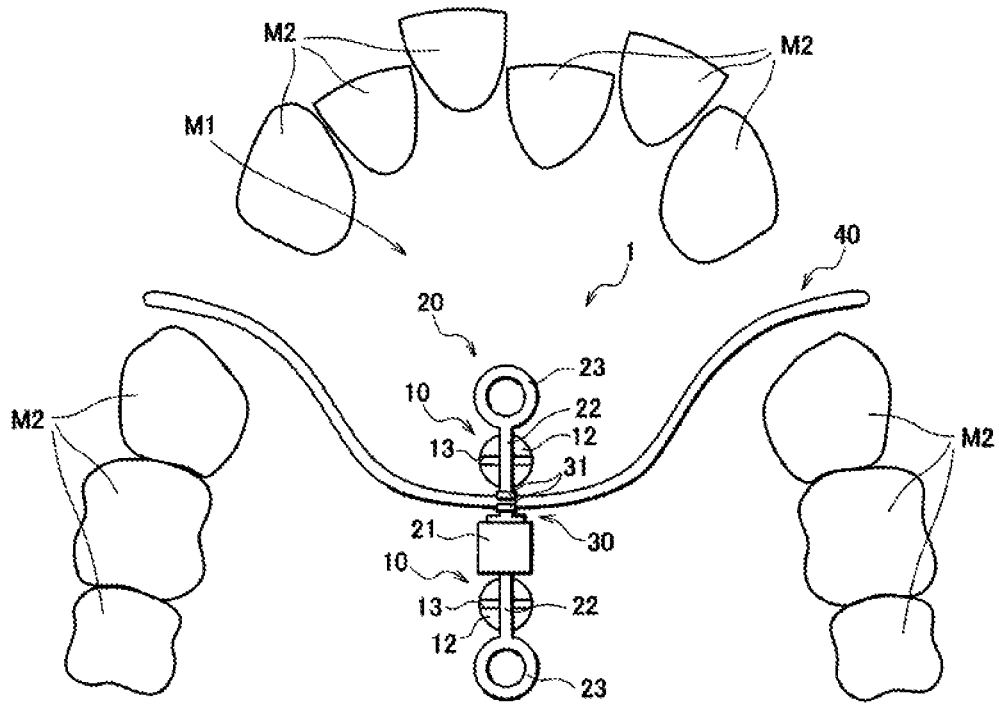
FIG. 1 is a drawing showing a configuration of an orthodontic implant device related to one embodiment of the invention.

FIG. 1 shows a configuration of an orthodontic implant device 1 as related to one embodiment of the invention. The orthodontic implant device 1 has a pair of anchor members 10 which are fixed in an oral cavity, specifically, a palate M1, a bridge member 20 arranged so as to link places between the pair of anchor members 10, and an arrangement member 30 arranged in the bridge member 20. The orthodontic implant device 1 may have an extension arm 40 formed of a wire, which is fixed relative to teeth M2 to move the teeth M2.

Figure 2:
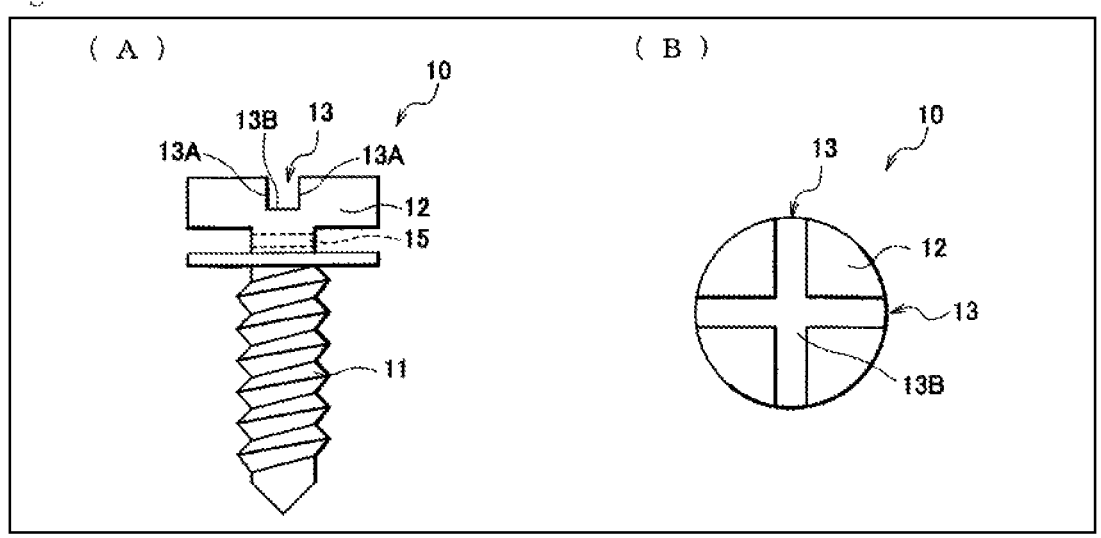
FIG. 2 is a drawing showing a configuration of the anchor member shown in FIG. 1.

FIG. 2 shows a configuration of an anchor member 10. FIG. 2(A) shows a configuration when viewed from a side, and FIG. 2(B) shows a configuration when viewed from a top. A pair of anchor members 10 are formed of a titanium alloy, for example, and each has a shank 11 on which a ridge is formed, and a head 12 formed in one end of the shank 11. A straight-line head groove 13 is formed on a side opposite to the shank 11 of the head 12. The head groove 13 is used for rotating the anchor member 10 by inserting a tool such as a screwdriver into the head groove 13 upon implanting the anchor member 10 into a palate M1, and simultaneously is used for arranging a bridge member 20 after the anchor member 10 is implanted into the palate M1. The head groove 13 is preferably formed wholly in an upper portion from a peripheral portion of the head 12 to a facing peripheral portion through a central portion. The reason is that the head groove 13 is used for arranging the bridge member 20.

The head groove 13 has a pair of side surfaces 13A and a bottom surface 13B therebetween, for example, and is preferably configured so as to have the perpendicular relationship between the pair of side surfaces 13A and the bottom surface 13B, namely, a relationship of crossing each other at a right angle. For example, a cross-sectional shape on a surface perpendicular to an extending direction of the head groove 13 is preferably configured to be a rectangle. In addition, the rectangle includes a square. The head groove 13 may be formed in a single groove, but is preferably formed in two grooves so as to be perpendicular to each other in the central portion of the head 12, for example. The reason is that the head grooves 13 of the pair of anchor members 10 can be easily adjusted so as to be positioned on the same straight line for arranging the bridge member 20.

Figure 3:
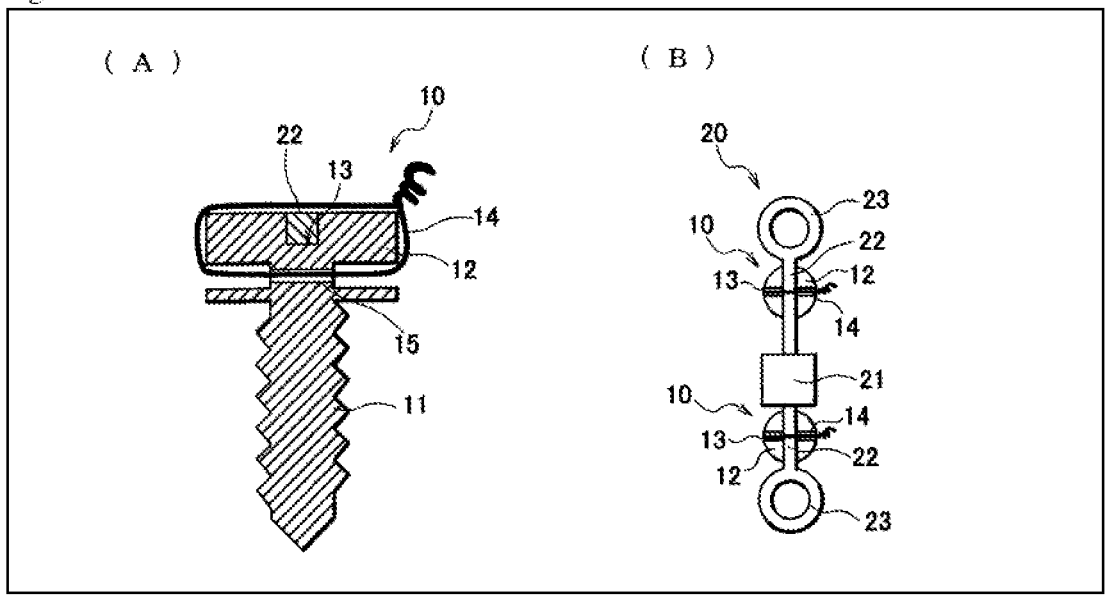
FIG. 3 is a drawing showing a state in which a bridge member is arranged in the anchor member shown in FIG. 1.

FIG. 3 shows a state in which a bridge member 20 is arranged in an anchor member 10. FIG. 3(A) shows a cross-sectional configuration when viewed from a side, and FIG. 3(B) shows a configuration when viewed from a top. In the anchor member 10, a through hole 15 for passing a ligature wire 14 therethrough is preferably provided on a side of a head 12 of a shank 11. The reason is that, after the bridge member 20 is arranged in a head groove 13, the bridge member 20 can be easily fixed by ligating the anchor member 10 and the bridge member 20 with the ligature wire 14 passed through the through hole 15. The through hole 15 is provided so as to pass through the shank 11 in a crosswise direction, for example. In addition, the ligature wire 14 is omitted in FIG. 1.

Figure 4:
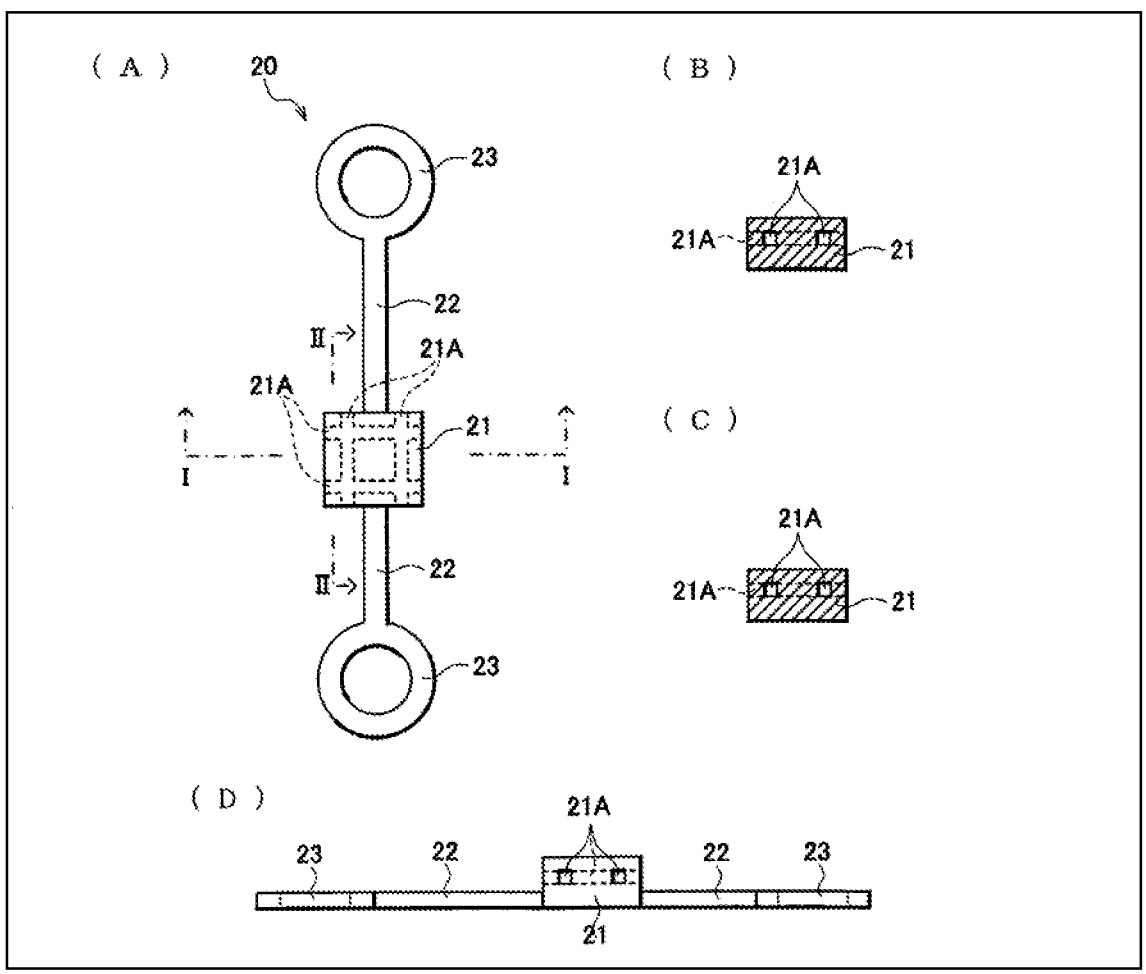
FIG. 4 is a drawing showing a configuration of the bridge member shown in FIG. 1.

FIG. 4 shows a configuration of a bridge member 20. FIG. 4(A) shows a configuration when viewed from a top, FIG. 4(B) shows a cross-sectional configuration taken along the line I-I shown in FIG. 4(A), FIG. 4(C) shows a cross-sectional configuration taken along the line II-II shown in FIG. 4(A), and FIG. 4(D) shows a configuration when viewed from a side. The bridge member 20 is formed of titanium, a titanium alloy or stainless steel, for example, and has a connecting portion 21 for connecting an arrangement member 30, and a pair of rectangular wire-shaped portions 22 provided in the connecting portion 21, and to be fitted into head grooves 13 of a pair of anchor members 10. The connecting portion 21 is formed in a rectangular parallelepiped shape, for example. In addition, the rectangular parallelepiped also includes a cube.

In the connecting portion 21, an insertion hole 21A for inserting a projection portion 32 to be described later for the arrangement member 30 is provided, for example. The insertion holes 21A are preferably provided in a plurality of places by changing extending directions, and are preferably provided in extending in the extending directions of the pair of rectangular wire-shaped portions 22 and in directions perpendicular thereto, respectively, for example. The reason is that directions of connecting the arrangement member 30 can be changed according to a treatment content.

The rectangular wire-shaped portion 22 is configured in a rectangular wire shape adapted to the head groove 13, for example. The reason is that the extension arm can be stably arranged by suppressing wobbling by fitting the rectangular wire-shaped portion 22 into the head groove 13. Moreover, it is preferable that the rectangular wire-shaped portion 22 is fixed to the anchor member 10 by the ligature wire 14 passed through the through hole 15, for example, and is fixed to the anchor member 10 by a bonding agent (not shown) as reinforcement. Specific examples of the bonding agent preferably include resin such as like a photocurable filling resin for dental use. In an end on a side opposite to the connecting portion 21 of each rectangular wire-shaped portion 22, an annular portion 23 formed in a ring shape is preferably provided, for example. The annular portion 23 is a structure advantageous for fixing an orthodontic device such as an elastic chain, an elastic thread and a ligature wire, and simultaneously is used for reducing harmfulness in the oral cavity. In addition, the annular portion 23 need not be in a perfect ring shape, and a ring may be partially cut.

Figure 5:
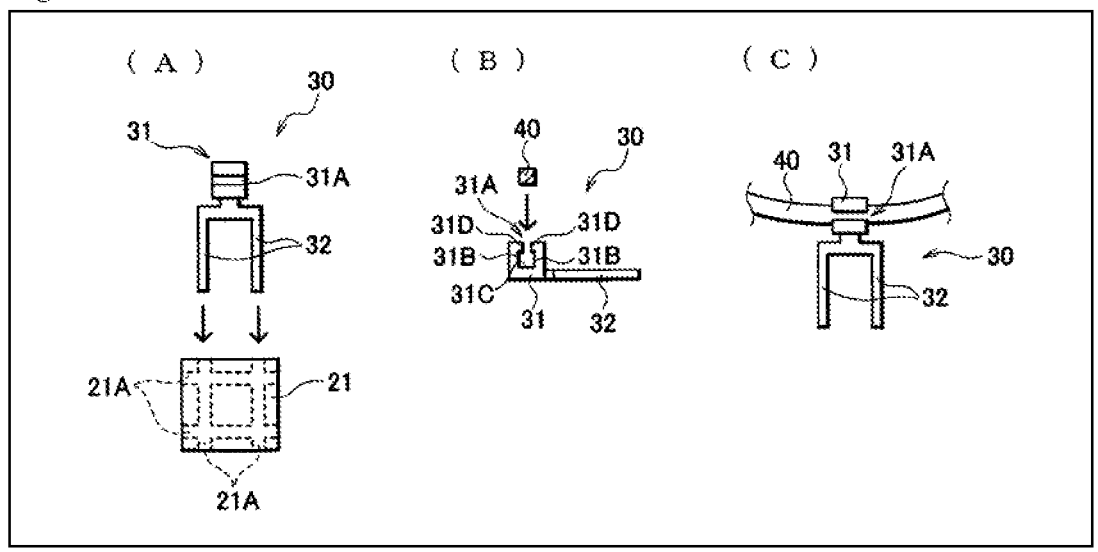
FIG. 5 is a drawing showing a configuration of the arrangement member shown in FIG. 1.

FIG. 5 shows a configuration of an arrangement member 30. FIG. 5(A) shows a configuration when viewed from a top, FIG. 5(B) shows a configuration when viewed from a side, and FIG. 5(C) shows a state in which an extension arm 40 is fixed to the arrangement member 30. The arrangement member 30 is formed of stainless steel, for example, and has a fixing portion 31 for fixing the extension arm 40, and a wire-shaped projection portion 32 for arranging the fixing portion 31 in a bridge member 20. In addition, in the arrangement member 30, a catching portion for catching a ligature wire may be provided upon ligating both.

The fixing portion 31 has a fixing groove 31A, and is configured in such a manner that part of the extension arm 40 can be fitted into and caulked at the fixing portion 31, thereby being fixed at the fixing portion 31. The fixing groove 31A has a pair of side surfaces 31B and a bottom surface 31C therebetween, for example, and is preferably configured to have a perpendicular relationship between the pair of side surfaces 31B and the bottom surface 31C, namely, a relationship of crossing each other at a right angle. The reason is that the extension arm 40 can be stably fixed by suppressing wobbling by configuring at least part of the extension arm 40 of the rectangular wire and fitting a part of the rectangular wire into the fixing groove 31A. On upper sides of the pair of side surfaces 31B, fastening portions 31D are preferably provided in projecting inward, respectively. The reason is that the extension arm 40 can be further stably fixed.

The projection portion 32 may be provided in one portion, but is preferably provided in a plurality of portions at intervals, for example, two portions in parallel to each other at intervals. The reason is that the extension arm 40 can be stably arranged by suppressing wobbling by rotation of the arrangement member 30 caused by deflection of the projection portion 32. Correspondingly thereto, in the connecting portion 21 of the bridge member 2, a plurality of insertion holes 21A are preferably provided at intervals in corresponding to the projection portions 32. Moreover, for example, when the insertion holes 21A are provided in a plurality of places by changing the extending directions, the insertion holes 21A are preferably provided by the plurality thereof in corresponding to the projection portions 32 for each extending direction.

When the plurality of projection portions 32 are provided, the projection portion 32 may be in a round wire shape or a rectangular wire shape, but if the projection portion 32 is formed in the rectangular wire shape, such a case is further preferable. The reason is that the extension arm 40 can be further stably arranged by forming the insertion hole 21A of the bridge member 20 in a prismatic shape adapted to the projection portion 32. In addition, when the projection portion 32 is formed in one portion, the projection portion 32 is preferably formed in the rectangular wire shape, and the insertion hole 21A of the bridge member 20 is preferably formed in the prismatic shape adapted to the projection portion 32. The reason is that such a shape suppresses rotation of the arrangement member 30.

Figure 6:
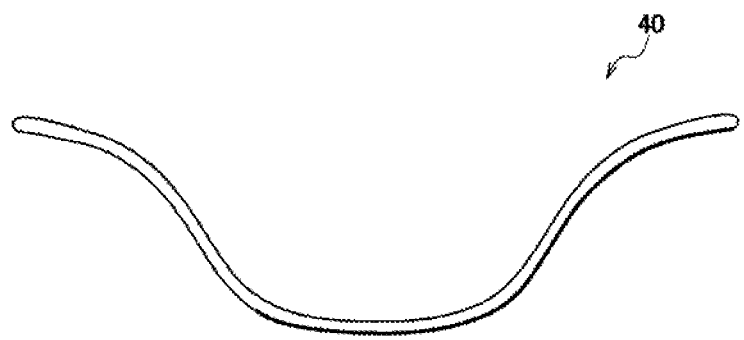
FIG. 6 is a drawing showing a configuration of the extension arm shown in FIG. 1.

FIG. 6 shows a configuration of an extension arm 40. The extension arm 40 may be formed of stainless steel, for example, but may be formed of a superelastic alloy such as a nickel-titanium alloy, and can be appropriately selected according to the treatment content. The reason is that the extension arm 40 can be fitted into and caulked at the fixing groove 31A, thereby being fixed at the fixing portion 31A, and therefore a heating process such as brazing is absent, and even a material weak to heat can also be used. The extension arm 40 is preferably formed of the rectangular wire, for example, but a part to be fitted into the fixing groove 31A may be formed of the rectangular wire, and parts from thereon may be formed to be a round wire. A shape of the extension arm 40 may have any form, and determined according to the treatment content. In addition, a dentist or the like may prepare the extension arm 40 according to the treatment content.

Figure 7:
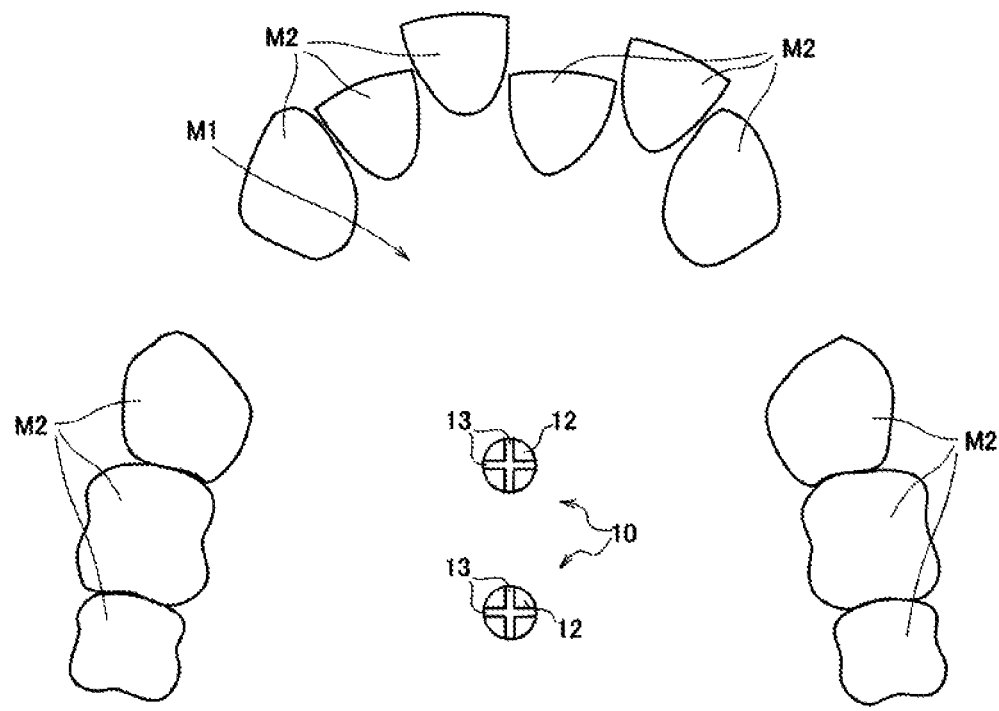
FIG. 7 is a drawing showing an attachment process for the orthodontic implant device shown in FIG. 1.

The orthodontic implant device 1 is used as described below, for example. First, for example, as shown in FIG. 7, a pair of anchor members 10 are implanted in a palate M1 of a patient to whom orthodontics is performed. Specifically, for example, the pair of anchor members 10 are implanted by inserting a tool such as a screwdriver into a head groove 13, and rotating the anchor member 10. On the above occasion, the head grooves 13 of the pair of anchor members 10 are preferably adjusted to be finally positioned on the same straight line. In addition, even if the head grooves 13 of the pair of anchor members 10 are deviated from the same straight line, such a deviation can be corrected according to procedures described later.

Figure 8:
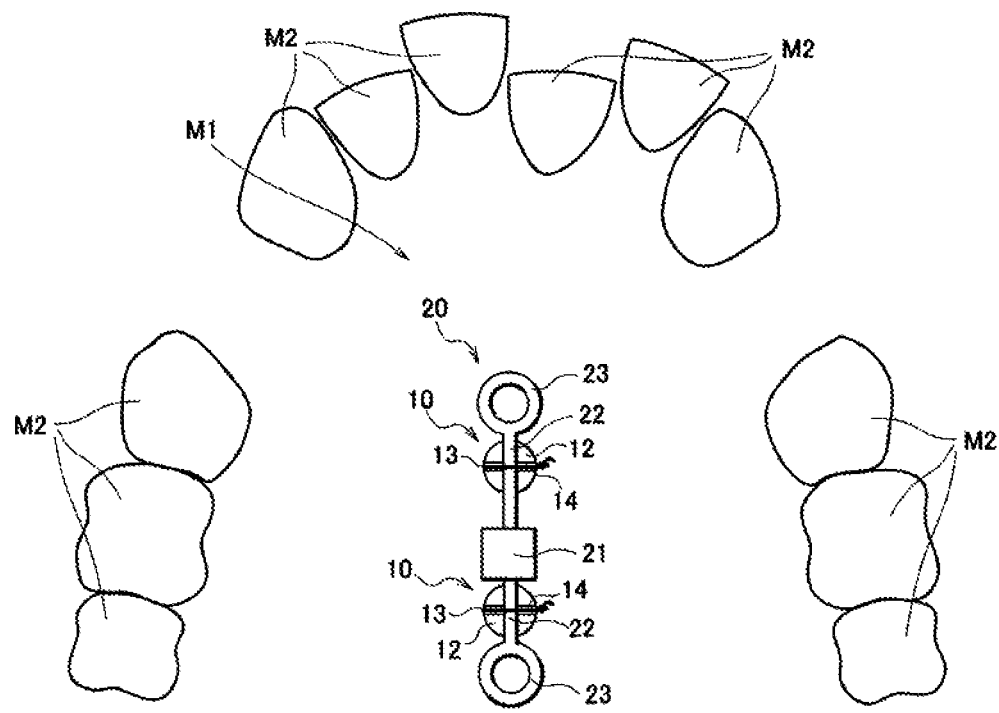
FIG. 8 is a drawing showing an attachment process following the process shown in FIG. 7.

Next, for example, as shown in FIG. 8, a bridge member 20 is arranged, and fixed to a pair of anchor members 10. Specifically, for example, a pair of rectangular wire-shaped portions 22 of the bridge member 20 are fitted into head grooves 13 of the pair of anchor members 10, and fixed thereto by a ligature wire 14. In addition, when the head grooves 13 of the pair of anchor members 10 are deviated from the same straight line, the pair of rectangular wire-shaped portions 22 of the bridge member 20 can be bent and fitted into the head grooves 13.

Figure 9:
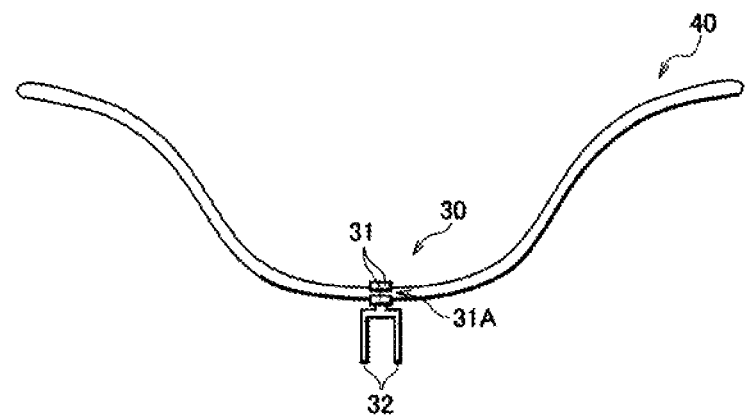
FIG. 9 is a drawing showing an attachment process following the process shown in FIG. 8.
Figure 10:
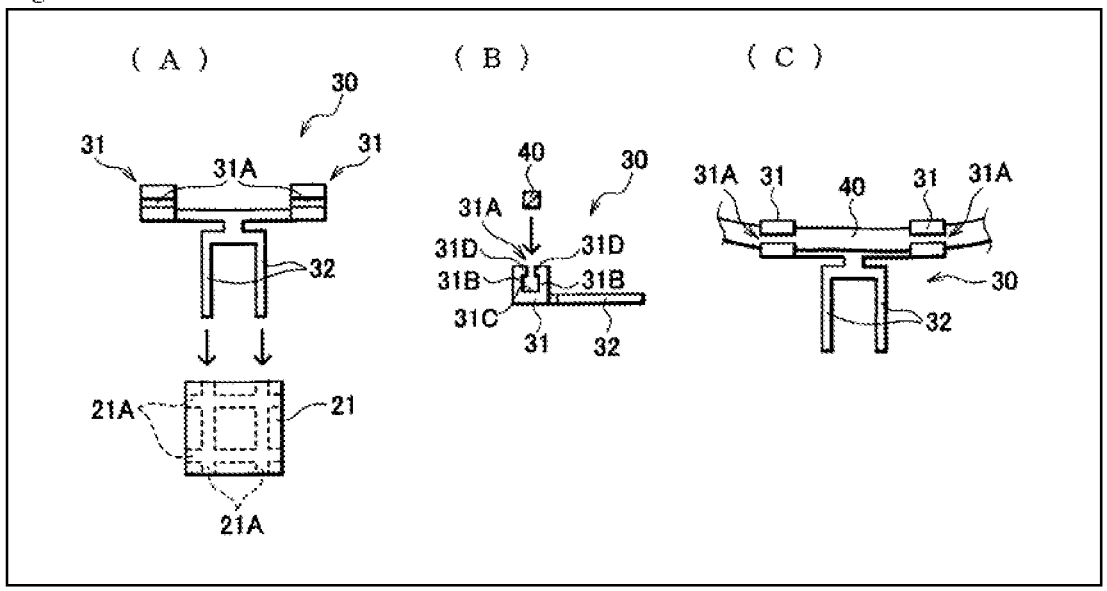
FIG. 10 is a drawing showing a modified example of an arrangement member.

Subsequently, for example, as shown in FIG. 9, an extension arm 40 is arranged, and fitted into and caulked at a fixing groove 31A of an arrangement member 30, thereby being fixed at the fixing groove 31A. Next, for example, as shown in FIG. 10, projection portions 32 of an arrangement member 30 are inserted into insertion holes 21A of a bridge member 20, and both are fixed by a ligature wire (not shown). Moreover, the extension arm 40 is fixed to teeth M2 to be moved. Thus, orthodontics is performed.

In addition, when the shape of the extension arm 40 is required to be changed according to a progress of treatment, the extension anus 40 are exchanged. More specifically, the arrangement member 30 to which the extension arm 40 is fixed is pull out from the bridge member 20, and a new extension arm 40 is fixed to the arrangement member 30, and the resultant material is inserted into the bridge member 20.

Thus, according to the present embodiment, the device is configured in such a manner that the device has the arrangement member 30 having the fixing portion 31 for fixing the extension arm 40, and the wire-shaped projection portion 32 for arranging the fixing portion 31 in the bridge member 20, and the fixing groove 31A having the perpendicular relationship between the side surfaces 31B and the bottom surface 31C is formed in the fixing portion 31, and part of the extension arm 40 is fitted into and caulked at the fixing groove 31A, thereby being fixed at the fixing portion 31A. Therefore, the extension arm 40 can also be formed of the superelastic alloy weak to heat, or the like, and the range of selection of materials can be extended. Moreover, even if a size of the member is small, the extension arm can be easily fixed, and the time and effort can be reduced.

Moreover, if the device is configured in such a manner that the plurality of projection portions 32 are provided in the arrangement member 30, and simultaneously the plurality of insertion holes 21A are provided in the connecting portion 21 of the bridge member 20, wobbling caused by rotation of the arrangement member 30 can be suppressed, and the extension arm 40 can be stably arranged.

Modified Example 1

FIG. 10 shows a configuration of an arrangement member 30 as related to Modified Example 1 of the invention. FIG. 10(A) shows a configuration when viewed from a top, FIG. 10(B) shows a configuration when viewed from a side, and FIG. 10(C) shows a state in which an extension arm 40 is fixed to the arrangement member 30. In the arrangement member 30, a plurality of fixing portions 31, for example, two portions are provided at intervals. Other configurations are similar to the configurations in one embodiment described above. If the arrangement member 30 is configured in such a manner, projection portions 32 of the arrangement member 30 are inserted into insertion holes 21A of a bridge member 20, and a ligature wire (not shown) is passed through places between the fixing portions 31 for each, and the arrangement member 30 and the bridge member 20 can be easily fixed. Accordingly, a catching portion for catching the ligature wire is not required to be provided in particular, and the configuration can be simplified.

Modified Example 2

Figure 11:
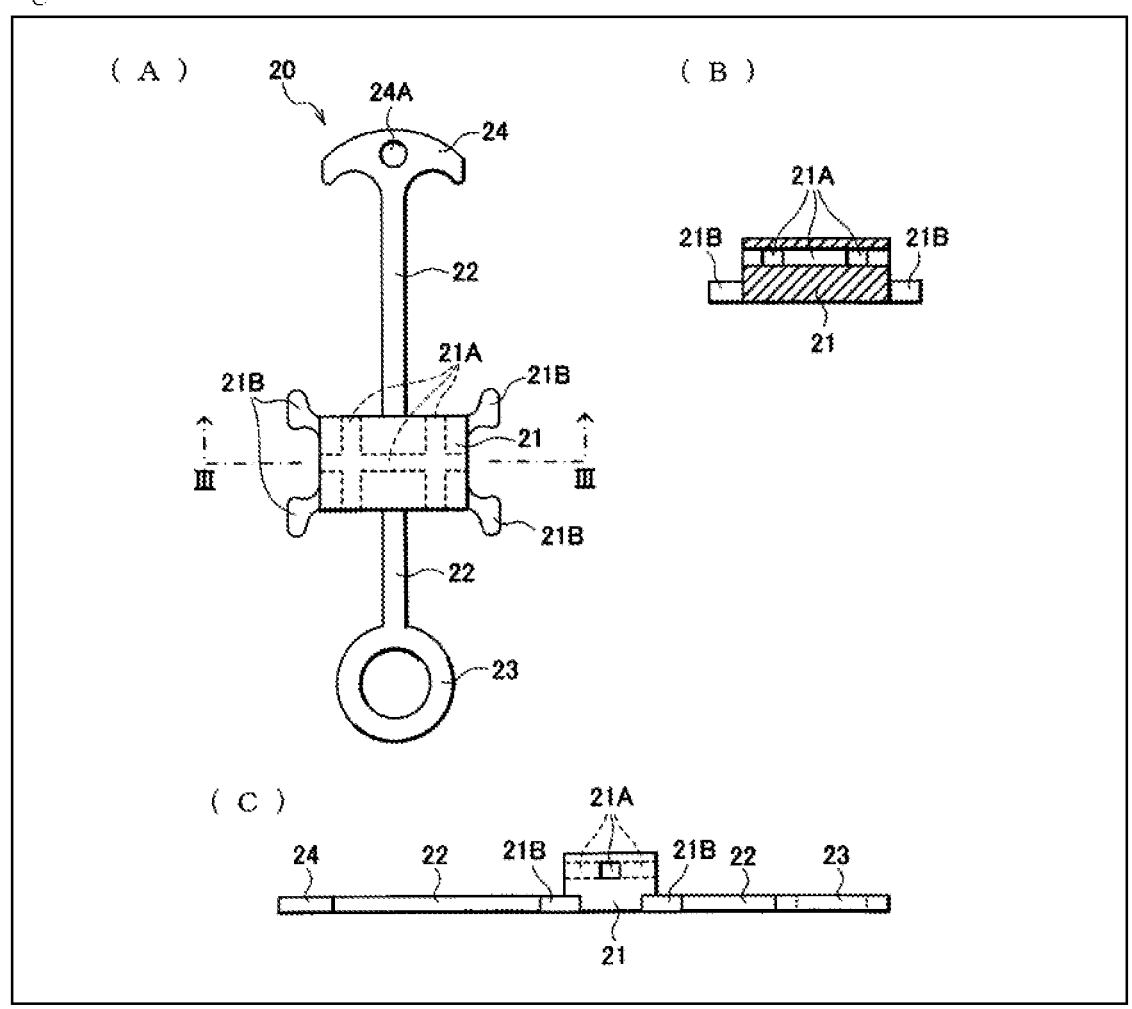
FIG. 11 is a drawing showing a modified example of a bridge member.

FIG. 11 shows a configuration of a bridge member 20 as related to Modified Example 2 of the invention. FIG. 11(A) shows a configuration when viewed from a top, FIG. 11(B) shows a cross-sectional configuration taken along a line II-III shown in FIG. 11(A), and FIG. 11(C) shows a configuration when viewed from a side.

In the bridge member 20, a curved portion 24 curved so as to project toward a side opposite to a connecting portion 21 is provided in an end of a rectangular wire-shaped portion 22 in place of an annular portion 23. It is preferable that the curved portions 24 each have a larger width in comparison with the rectangular wire-shaped portion 22, and are provided in projecting on both sides, and are formed in an anchor shape, for example. Even if the bridge member 20 is configured in such a manner, an orthodontic device such as an elastic and a ligature wire can be fixed in a manner similar to the annular portion 23, and simultaneously harmfulness in an oral cavity can be reduced, and therefore such a case is preferable. The bridge member 20 may be configured in such a manner that, in the curved portion 24, a hole 24A for fixing the orthodontic device such as the elastic and the ligature wire is provided. In addition, FIG. 11 shows a case where the curved portion 24 is provided in one end of the rectangular wire-shaped portion 22 and the annular portion 23 is provided in the other end of the rectangular wire-shaped portion 22. However, in the case described above, a rear portion was formed in a circular shape so as not to inhibit a flow of food, and both may be formed in the curved portions 24 according to a case.

Moreover, in the bridge member 20, for example, a fastening portion 21B for fixing the orthodontic device such as the elastic chain, the elastic thread and the ligature wire may be provided in projecting from the connecting portion 21. It is preferable that, with regard to the fastening portion 21B, two portions are provided for each on both sides of a pair of rectangular wire-shaped portions 22 in the extending direction, for example. Other configurations are similar to the configurations in one embodiment described above.

As described above, the invention is described by way of the embodiments, but the invention is not limited thereto, and can be modified in various ways. For example, in the embodiment described above, each component is specifically described, but the device need not have all the components, or may have any other component. Moreover, each component may have any other configuration. Moreover, a region to which the anchor member 10 is fixed is not limited to the palate M1, either, and the anchor member 10 can also be fixed to a region in which an attached gingiva exists and has no hindrance in movement of teeth in the oral cavity, for example, to a crest of alveolar bone of edentulous jaw part.

INDUSTRIAL APPLICABILITY

The invention can be applied to orthodontics.

REFERENCE SIGNS LIST

1 . . . Orthodontic implant device, 10 . . . anchor member, 11 . . . shank, 12 . . . head, 13 . . . head groove, 13A . . . side surface, 13B . . . bottom surface, 14 . . . ligature wire, 15 . . . through hole, 20 . . . bridge member, 21 . . . connecting portion, 21A . . . insertion hole, 21B . . . fastening portion, 22 . . . rectangular wire-shaped portion, 23 . . . annular portion. 24 . . . curved portion, 24A . . . hole, 30 . . . arrangement member, 31 . . . fixing portion, 31A . . . fixing groove, 31B . . . side surface, 31C . . . bottom surface, 31D . . . fastening portion, 32 . . . projection portion, 40 . . . extension arm

The invention claimed is:

1. An orthodontic implant device which is configured to be fixed in an oral cavity, in order to perform orthodontics by connecting an extension arm formed of a wire for moving teeth, the device comprising:
   a pair of anchor members which are configured to be fixed in the oral cavity;
   a bridge member which connects the pair of anchor members to each other; and
   an arrangement member which engages the bridge member, wherein:
each of the pair of anchor members comprises a shank on which a ridge is formed, and a head which is connected to one end of the shank and which comprises a first groove,
the bridge member comprises a connecting portion provided with a plurality of insertion through-holes that intersect each other, and a pair of rectangular wire-shaped portions attached to outer surfaces at opposite ends of the connecting portion, and
each of the pair of rectangular wire-shaped portions is fitted into the first groove on one of the pairs of anchor members,
the arrangement member comprises at least one fixing portion, and two or more wire-shaped projection portions that are connected to the at least one fixing portion, each of the two or more wire-shaped projection portions being inserted into one of the plurality of insertion through-holes of the connecting portion, and
the fixing portion comprises a second groove which comprises a second pair of opposite-facing walls and which is configured to receive the extension arm, and a pair of fastening portions which extend from the opposite-facing walls of the second groove toward each other and which are configured to partially enclose the second groove.

2. The orthodontic implant device according to claim 1, wherein:
the arrangement member comprises a plurality of the fixing portions which are provided at intervals on the arrangement member.

3. The orthodontic implant device according to claim 1, wherein:
the first groove comprises a first base and a first pair of opposite-facing side walls, and the first pair of opposite-facing side walls are oriented perpendicularly with respect to the first base.

4. The orthodontic implant device according to claim 1, wherein:
the second groove comprises a second base, and
the second pair of opposite-facing side walls are oriented perpendicularly with respect to the second base.

5. An orthodontic implant device, comprising:
an extension arm which is formed of a wire, and which is configured to be fixed to teeth in order to move the teeth;
a pair of anchor members which are configured to be fixed in the oral cavity;
a bridge member which connects the pair of anchor members to each other; and
an arrangement member which engages the bridge member,
wherein:
each of the pair of anchor members comprises a shank on which a ridge is formed, and a head which is connected to one end of the shank and which comprises a first groove,
the bridge member comprises a connecting portion provided with a plurality of insertion through-holes that intersect each other, and a pair of rectangular wire-shaped portions attached to outer surfaces at opposite ends of the connecting portion, and
each of the pair of rectangular wire-shaped portions is fitted into the first groove on one of the pairs of anchor members,
the arrangement member comprises at least one fixing portion, and two or more wire-shaped projection portions that are connected to the at least one fixing portion, each of the two or more wire-shaped projection portions being inserted into one of the plurality of insertion through-holes of the connecting portion,
the fixing portion comprises a second groove which comprises a second pair of opposite-facing walls, and a pair of fastening portions which extend from the opposite-facing walls of the second groove toward each other to partially enclose the second groove, and
at least a portion of the extension arm is held in the second groove by the pair of fastening portions.

6. The orthodontic implant device according to claim 5, wherein:
the arrangement member comprises a plurality of the fixing portions which are provided at intervals on the arrangement member.

* * * * *